June 30, 1936.　　　R. F. DOW　　　2,045,572
OVERLOAD SAFETY DEVICE
Filed May 10, 1932
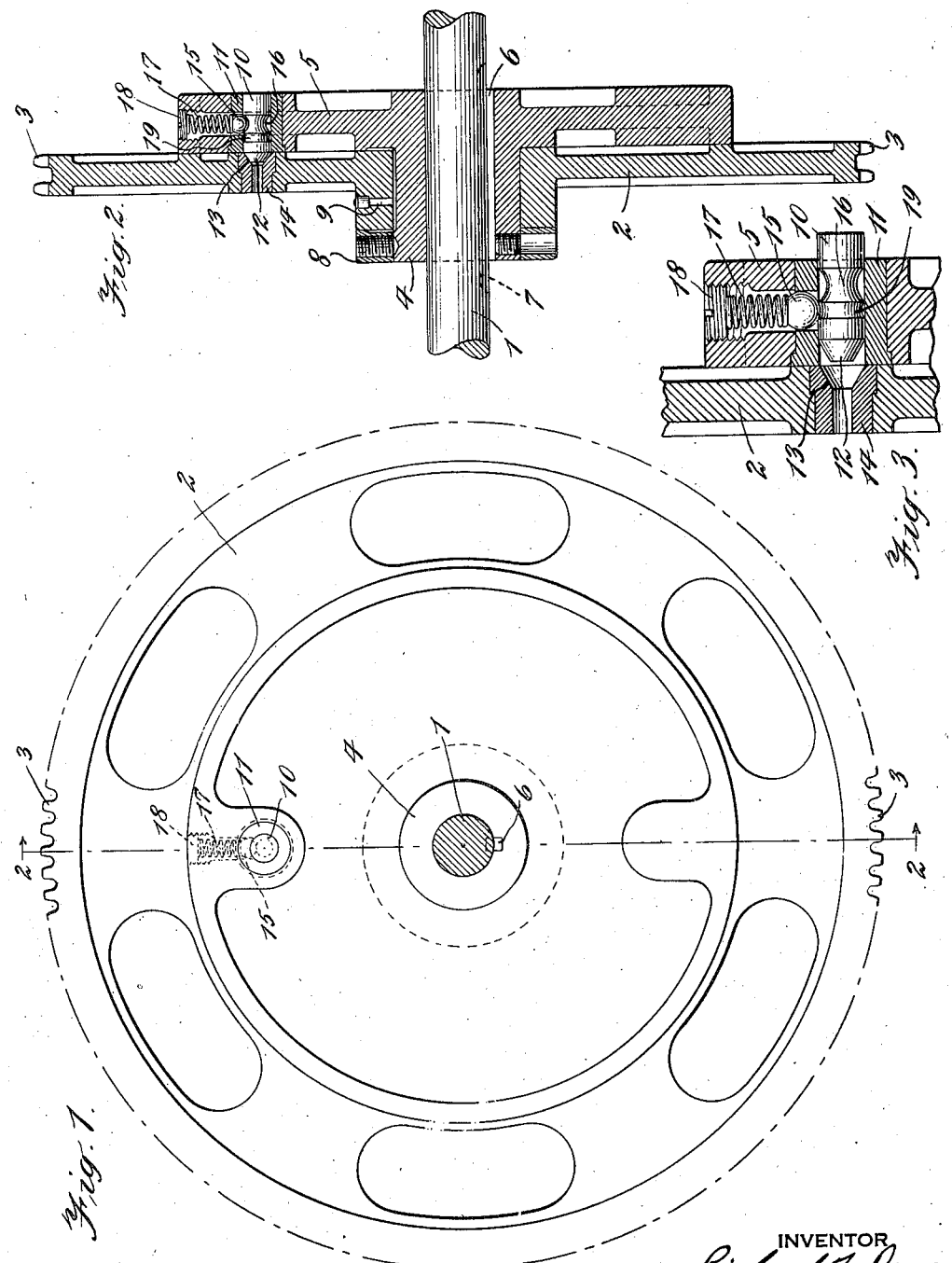

Patented June 30, 1936

2,045,572

UNITED STATES PATENT OFFICE 2,045,572

OVERLOAD SAFETY DEVICE

Richard F. Dow, Hartford, Conn., assignor to The Whitney Chain & Mfg. Company, Hartford, Conn., a corporation of Connecticut Application May 10, 1932, Serial No. 610,490

6 Claims. (Cl. 192—56)

This invention relates to a novel and improved device for yielding under an overload, and the novel features will be best understood from the following description and the annexed drawing, in which I have shown a selected embodiment of the invention, and in which Fig. 1 is a face view of a sprocket having my invention applied thereto, this view being taken from the right of Fig. 2.

Fig. 2 is a section on the line 2—2 of Fig. 1.

Fig. 3 is a fragmentary section on an enlarged scale, showing certain of the parts appearing in Fig. 2 in different positions than shown in that figure.

I have shown the invention as employed in connection with a driven shaft 1 and a driving sprocket 2 provided with the usual teeth 3 adapted to be engaged by a chain. For the sake of simplicity, I shall hereinafter refer to the above parts as a sprocket and shaft, although it is to be understood that the device may be used in other locations where found desirable and that the above terms are not used in a limiting sense.

The sprocket 2 is rotatably mounted upon the shaft 1, in this instance being mounted upon a hub 4 which is provided with a plate or flange 5 extending radially outwardly from the shaft for a substantial distance and disposed closely adjacent to the sprocket. The hub 4 may be secured to the shaft as by means of a key 6 in a keyway 7 on the shaft or by any other suitable means, so that the hub with its plate will rotate with the shaft, whereas the sprocket may rotate upon the hub under certain conditions. The sprocket may be held in close engagement with the plate 5 as by means of a collar 8 secured to the hub, and lubrication may be provided by an oil hole 9.

In the past, it has been common to provide overload safety devices in the form of shear pins which will break when the maximum load is reached. There are numerous disadvantages in the use of shear pins, such as the need for accurate calculation thereof and the continual use of the same material in the pins. Other disadvantages are well known to those skilled in the art. According to my invention, I have avoided all such disadvantages by providing in the plate 5 a pin 10 slidably mounted in a bushing 11 and having a tapered end 12 forming a cam surface which is adapted to contact with a second cam surface formed by the tapered walls of a recess 13 in a bushing 14 secured to the sprocket 2. The pin and bushings are preferably made of hardened steel or other long wearing material.

The pin in Fig. 2 is shown in position where the tapered end 12 is received in the recess 13, and when in that postion it will be seen that there is a driving connection between the sprocket and the shaft. That is to say, assuming that the sprocket is the driving element and the shaft is the driven element, the shaft will be driven from the sprocket by the pin 10 and the plate 5 which, through the hub 4 and key 6, is secured to the shaft. I preferably provide an auxiliary driving device for yieldingly holding the pin in engagement with the sprocket, this driving device being exemplified by a spring-pressed detent formed in this instance by a ball 15 received in a recess in the pin, here shown in the form of a circumferential groove 16, this form of recess being of advantage in that the pin may turn at its will in the bushing 11 without affecting the operation of the detent. The ball is normally urged into the groove 16 by means of a compression spring 17 which may be held in place by a screw plug 18 threaded into the plate 5. It will be obvious that by turning the plug 18 with a screw driver, the amount of force exerted by the spring 17 upon the ball 15 may be varied to suit different conditions. While, for purposes of illustration, I have shown the pin as supported on the plate and as received in a recess in the sprocket, and while, for the purpose of convenience, I shall claim the parts as so arranged, it is of course to be understood that this arrangement may be reversed without departing from the invention.

Still assuming that the sprocket is driving the shaft, it will be seen that, so long as only a certain force is used, the ball 15 will hold the pin 10 in the position shown in Fig. 2. However, upon the occurrence of an overload, the cam surfaces formed by the tapered end of the pin and the tapered wall of the recess 13 will force the pin to the right as viewed in Fig. 2 until the pin leaves the recess entirely, thus breaking the driving connection. By adjusting the plug 18, the connection can be caused to yield at any load which is considered desirable as a limit for the particular operation for which the device is being used, the ball 15 thus acting as part of the driving connection and being cammed out of the groove 16 against the action of the spring 17 when the connection is broken.

I preferably also provide means for yieldingly holding the pin in the retracted or inoperative position shown in Fig. 3, as well as in the operative position shown in Fig. 2. This means may comprise the same detent 15 which may be received in a second groove 19 in the pin 10, this groove being of less depth than the groove 16. This groove need be of less depth as, of course, there is no force being exerted upon the pin in this position, and I preferably make the groove shallow so that the pin may be easily displaced again towards the left of Figs. 2 and 3, as by the hand of the operator. It will be seen that, as the ball 15 cams into the groove 19, it will aid somewhat in withdrawing the pin from the recess 13 and thus will aid in breaking the driving connection promptly and completely.

It will thus be seen that I have provided a novel and improved device which will form a driving connection between driving and driven elements and which will readily yield upon the application of an overload to the connection. After the cause of the overload is removed, then the connection may be again readily established by simply turning the sprocket until the pin and sprocket recess appear to be in line, when a light blow on the rear end of the pin will snap it into place in the recess in the sprocket. By locating the pin in a plate disposed at a substantial distance from the axis of the shaft which it is driving, it will be seen that, by means of the mechanical advantage thus obtained, the force exerted upon the pin is relatively small and thus the pin and the spring 17 may be made relatively weak.

While I have shown the invention as embodied in a specific form, it is to be understood that various changes in details may be made without departing from the scope of the invention, and I therefore do not intend to limit myself except by the appended claims.

I claim:

1. In an overload safety device, two elements comprising a shaft and a sprocket rotatably mounted thereon, a driving connection between said elements comprising a pin slidably supported on said shaft and movable lengthwise thereof, said pin having a tapered end normally received in a tapered recess in said sprocket, whereby the pin will be cammed out of the sprocket upon exertion of an overload on the driving connection, and a spring pressed member received in a circumferential groove in said pin, said member and a wall of said groove having cam surfaces adapted to contact with each other when said member is in said groove, and said contact acting to maintain the tapered end of the pin in said recess, whereby upon such breaking of the driving connection by exertion of an overload, said member must be cammed out of the groove against the action of its spring.

2. In an overload safety device, two elements comprising a shaft and a sprocket rotatably mounted thereon, a driving connection between said elements comprising a pin slidably supported on said shaft and movable lengthwise thereof, said pin having a tapered end normally received in a tapered recess in said sprocket, whereby the pin will be cammed out of the sprocket upon exertion of an overload on the driving connection, and a spring pressed member received in a circumferential groove in said pin, said member and a wall of said groove having cam surfaces adapted to contact with each other when said member is in said groove, and said contact acting to maintain the tapered end of the pin in said recess, whereby upon such breaking of the driving connection by exertion of an overload, said member must be cammed out of the groove against the action of its spring, said pin having a second circumferential groove adjacent the first-named groove and adapted to receive said ball after it has been thus cammed out of the first-named groove, said second groove being so placed that the ball therein will hold the tapered end of the pin out of said recess.

3. In an overload safety device, a shaft having a plate fixed thereon and extending outwardly therefrom, a sprocket rotatable about said shaft and disposed adjacent said plate, said sprocket having a tapered recess therein opening towards said plate, a pin slidably mounted on said plate and having a tapered end adapted to be received in said tapered recess, said pin having two circumferentially extending grooves adjacent each other and the one nearest the sprocket being of less depth than the other, an auxiliary driving device movable on the plate transversely of the pin and adapted to enter either of said grooves, and means yieldingly holding said device in one of said grooves.

4. In an overload safety device, a shaft having a plate fixed thereon and extending outwardly therefrom, a sprocket rotatable about said shaft and disposed adjacent said plate, said sprocket having a tapered recess therein opening towards said plate, a pin slidably mounted on said plate and having a tapered end adapted to be received in said tapered recess, said pin having two circumferentially extending grooves adjacent each other and the one nearest the sprocket being of less depth than the other, a ball movable on the plate transversely of the pin and adapted to enter either of said grooves, and a light spring urging said ball towards said pin.

5. In an overload safety device, a shaft having a plate fixed thereon and extending outwardly therefrom, a sprocket rotatable about said shaft and disposed adjacent said plate, said sprocket having a tapered recess therein opening towards said plate, a pin slidably mounted on said plate and having a tapered end adapted to be received in said tapered recess, said recess and pin being spaced from the shaft, a cam surface on said pin spaced from said tapered end thereof and extending transversely of the pin, a driving device mounted on said plate and movable thereon transversely of said pin and having a cam surface adapted to contact with the cam surface on said pin, and a spring yieldingly holding said cam surfaces in engagement when said tapered end of the pin is received in said tapered recess, whereby said pin end may be forced out of said recess by an overload thereon only by displacing said device against the action of said spring.

6. In an overload safety device, a shaft having a plate fixed thereon and extending outwardly therefrom, a sprocket rotatable about said shaft and disposed adjacent said plate, said sprocket having a tapered recess therein opening towards said plate, a pin slidably mounted on said plate and having a tapered end adapted to be received in said tapered recess, said recess and pin being spaced from the shaft, a cam surface on said pin spaced from said tapered end thereof and extending transversely of the pin, a driving device mounted on said plate and movable thereon transversely of said pin and having a cam surface adapted to contact with the cam surface on said pin, a spring yieldingly holding said cam surfaces in engagement when said tapered end of the pin is received in said tapered recess, whereby said pin end may be forced out of said recess by an overload thereon only by displacing said device against the action of said spring, and a formation on said pin adapted to engage said device when thus displaced and thus yieldingly hold said pin end out of said recess.

RICHARD F. DOW.